United States Patent [19]

Kuparinen

[11] 4,019,243
[45] Apr. 26, 1977

[54] METHOD FOR FORMING A TUBULAR WRITING PEN

[75] Inventor: Lasse Kuparinen, Hamburg, Germany

[73] Assignee: Koh-I-Noor Rapidograph, Inc., Bloomsbury, N.J.

[22] Filed: Mar. 12, 1976

[21] Appl. No.: 666,299

Related U.S. Application Data

[62] Division of Ser. No. 535,051, Dec. 20, 1974, Pat. No. 3,977,798.

[52] U.S. Cl. .............................. 29/453; 29/DIG. 9
[51] Int. Cl.² ........................................ B23P 11/02
[58] Field of Search ............... 29/DIG. 9, 453, 450; 401/258, 259, 265

[56] References Cited

UNITED STATES PATENTS

| 1,177,404 | 3/1916 | Estes .................................. 401/258 |
|---|---|---|
| 1,301,774 | 4/1919 | Wilson ..................... 29/DIG. 9 UX |
| 1,503,023 | 7/1924 | Carlson ..................... 29/DIG. 9 UX |
| 2,627,844 | 2/1953 | Johnson .............................. 401/259 |
| 2,760,691 | 8/1956 | Henchert ....................... 29/453 UX |
| 2,941,511 | 6/1960 | Cieremans ........................ 29/453 X |
| 3,171,196 | 3/1965 | Helitas ............................... 29/453 X |
| 3,306,267 | 2/1967 | Matsumoto ........................ 401/258 |
| 3,558,235 | 1/1971 | Bok ..................................... 401/258 |
| 3,671,132 | 6/1972 | Wittnebert ......................... 401/258 |

*Primary Examiner*—Charlie T. Moon
*Attorney, Agent, or Firm*—David H. Semmes

[57] ABSTRACT

An improved writing point assembly for stylographic, or tube pens and a method for making such an improved writing point. The writing tube itself may be formed by a deep drawing operation and then secured, in a surrounding relationship, to the front end of a plastic cylindrical member, which itself may be formed by being injection molded within the writing tube.

5 Claims, 3 Drawing Figures

METHOD FOR FORMING A TUBULAR WRITING PEN

This is a division of application Ser. No. 535,051, filed Dec. 20, 1974, now U.S. Pat. No. 3,977,798.

BACKGROUND OF THE INVENTION

The writing point of a tube writing pen usually consists of a plastic cylindrical member traversed from end to end by a channel for the passage therethrough of ink from an ink reservoir at the end of the channel remote from the writing end of the point, and a cleaning wire, which is attached to a drop weight, and which extends into the channel. A metal writing tube is then attached to the front end of the cylindrical member, usually by being fitted into the cylindrical member, so that it is coaxially aligned with the channel for the ink.

The writing tubes are usually produced by machining a blank of metal tubing on a lathe, the free end of the tubular blank being first face machined, the leading edge being rounded off and an ink step being then turned into the tube material. A length of the tube is then cut off, according to the length of the writing tube that is required, and the face of the "writing tube" thus produced may be submitted to a surface treatment. In order to provide the writing tube with adequate hardness it is generally also hard chromiumplated.

The finished writing tube is then fitted into, or within, the cylindrical body for instance by imparting a vibratory motion to the tube.

This method of producing a writing tube and of securing it to a cylindrical member is complicated and costly, firstly because the starting material that must be used, the thin metal tubing, is rather expensive and secondly because a machining operation is necessary which must then be followed by a hard chromium-plating operation step.

OBJECTS OF THIS INVENTION

In contradiction thereto it is an object of the present invention to provide a method of producing the writing points of tube writing pens in a much less complicated and cheaper way.

According to one aspect of the present invention there is provided a method of producing a writing point for a tube writing pen, the writing point comprising a cylindrical member traversed from end to end by a channel for the passage therethrough of ink from an ink reservoir at the rear end of the channel, and a writing tube attached to the front end of the cylindrical member, wherein the writing tube is either pushed over the cylindrical member, from the front end thereof, and secured in place, or the writing tube itself is used as a mould for the in situ production, within itself, of the cylindrical member by an injection moulding step. The writing tube itself is preferably first made by deepdrawing the same from a flat blank in consecutive stages and cutting off the leading end.

According to the present method of this invention, a shaped part is therefore used as a writing tube, and the writing tube itself embraces the front end of the cylindrical member in a surrounding relation, instead of being fitted or inserted into the same. Furthermore the production of the writing tube itself is particularly simple and economical if it is done by a series of deep-drawing stages.

Deep-drawing in stages is per se a well known process, and it has been already proposed for the production of the front end parts of ball point pen refills. When applied to a writing tube, however, this method has the particular advantage of permitting the writing points of tube writing pens to be very easily and economically produced because, apart from the cutting off of the end of the deep-drawn part, substantially no other machining work is required. Furthermore, the final assembly operation of pushing the tube over a preformed cylindrical member or, alternatively, even using the thusly formed writing tube as a mould in the production of the cylindrical member, greatly facilitates the manufacturing step of physically connecting the writing tube to the cylindrical member.

In order to prevent the writing tube from scratching the surface that is being written upon, and to avoid excessive abrasion and rapid wear, the front part of the writing tube, after its end has been cut off, may be cold worked to form a smooth writing face and a defined outlet orifice for the ink, and possibly also radially compressed for the purpose of reducing its diameter.

According to another aspect of the present invention there is provided a writing point, for a tube writing pen, which comprises a cylindrical member, traversed from end to end by a channel for the passage therethrough of ink, and a writing tube attached to the front of the cylindrical member in such a way that it embraces the front end of the cylindrical member.

The front face of the writing tube is preferably substantially flat and is formed with a well-defined outlet orifice for the ink.

In order to secure the writing tube upon the cylindrical member, the rear end of the writing tube may be provided with an impressed inwardly directed annular corrugation adapted to engage a similar annular groove in the cylindrical member.

Figure 1:
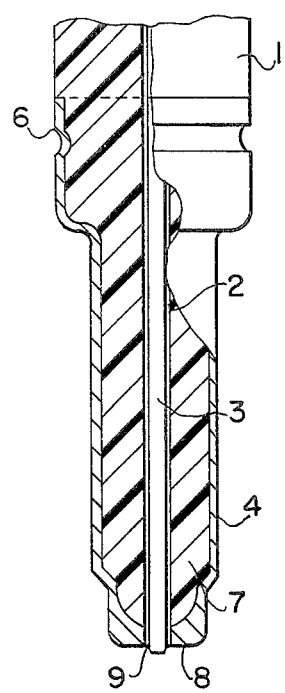
FIG. 1 is a part sectional view of the front end part of a cylindrical member which is provided with a writing tube.

DESCRIPTION OF THE PREFERRED EMBODIMENTS:

Referring now to FIG. 1 of the drawings, there is shown the front end portion of a cylindrical member 1 which is traversed from end to end by a channel 2 for the passage therethrough of ink from an ink reservoir (not shown) at the rear end of the channel. The terms "front" and "rear" are used herein to denote the end nearer the writing end or paper when the pen is in use and the end remote from the writing end. The cleaning wire 3 of a drop weight (not shown in the drawing) extends through the channel.

The construction of such a cylindrical member need not be described in detail. Embodiments have already been described for instance in German Patent Specification No. 1,253,106 and in the specification of German Patent Application No. 2,159,522, laid open prior to acceptance.

As shown, the front part of the cylindrical member 1 is embraced by a writing tube 4 which is formed with a conventional ink step 7, and a flat front-end face 8. The face 8 is formed with an outlet orifice 9 for the ink, into which orifice the cleaning wire 3 also projects, and which coaxially aligns with the ink channel in the cylindrical member 1.

In order to prevent the writing tube 4 from becoming detached from the cylindrical member 1, the rear part of the writing tube is formed with an impressed inwardly directed annular corrugation 6 which engages a corresponding annular groove in the cylindrical member 1.

The entire assembly of a cylindrical member provided with such a writing tube can be produced, according to this invention, by first moulding the cylindrical body 1 from a synthetic plastics material, (for instance by injection moulding), and then forcing the previously made writing tube 4 over the cylindrical member from the front end thereof until the corrugation 6 engages the corresponding annular groove in the cylindrical member. Then the cleaning wire 7, and drop-weight assembly, can be inserted into the channel 2 to form a functional stylus or tube writing point.

However, a more advantageous way of producing the writing point, according to this invention, consists in using the writing tube 4 itself as a mould for producing the cylindrical member 1, i.e., by inserting the finished tube 4 into an injection mould and then producing the cylindrical member. In this procedure the pre-formed writing tube 4 is filled with the synthetic plastics material, with a core device so that the outlet orifice or channel 2 for the ink is left clear, with the advantageous result that the cylindrical member 1 and the writing tube are firmly bonded together and the writing point, itself, is thus completed.

Figure 2:
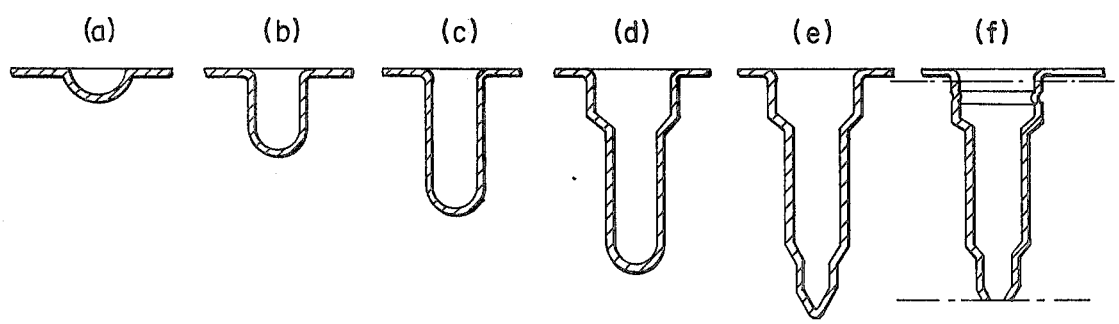
FIG. 2 is a schematic representation of the steps involved in the production of the writing tube by deep-drawing in stages.

The simplest and most economical way of producing the writing tube 4 is by a deep-drawing operation which is conveniently accomplished in stages (a)–(f) as shown in FIG. 2. As illustrated within this figure the writing tube is formed from a flat blank by repeated cupping steps with intervening annealing heat treatment.

At the end of the fifth stage of this procedure, the front end of the deepdrawn cup is cut off, as illustrated at (f), and the cut end face may then be ground. Moreover, the corrugation 6 in the writing tube, FIG. 2, can be so produced by radial compression and the diameter of the tube simultanously reduced.

The resultant shape, after the deep-drawing steps of (a)–(f), could, as such, be used as a writing tube, but the front end face of the tube might still be liable to scratch the writing surface and also be subject to inordinate wear by virtue of being insufficiently hard.

Figure 3:
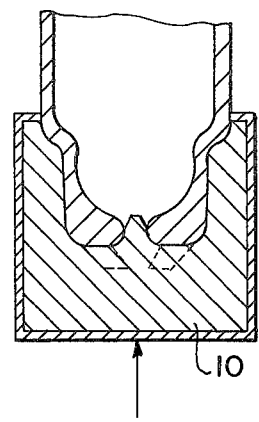
FIG. 3 is a schematic representation of a method of cold working the front part of the writing tube.

It is therefore desirable to perform a further manufacturing step of shaping the front end of the tube by cold forming in such a way that a smooth and flat end face 8 is obtained. This operation can be performed with a hard metal tool 10 as shown in FIG. 3.

An end face can thus be formed on the writing tube which will not scratch on any substrate. Moreover, cold forming results in the material at the end of the writing tube being work hardened, thus imparting sufficient hardness to the face 8 to obviate the need for any expensive subsequent step such as chromiumplating.

I claim:
1. The method of producing a writing point for a stylographic, or tube writing pen of the type wherein the writing point comprises, in combination, a cylindrical member, traversed from end to end by a channel for the passage therethrough of ink from an ink reservoir at a rear end of the channel, and a writing tube attached to a front end of said cylindrical member, comprising the steps of:
  A. forming said writing tube with a front end and a rear end wherein the forming of said writing tube comprises deep-drawing a flat blank of metal in successive stages to define an elongated cup and then cutting off the bottom of said cup to define said front end of said writing tube, and;
  B. forming a flat writing surface at said front end, wherein the front end is cold formed to create, at said writing tube end, a hardened writing surface and to define said outlet orifice for ink, and;
  C. forming an ink outlet orifice in said flat writing surface, and;
  D. securing the thusly formed writing tube in a surrounding relation around said front end of said cylindrical member.

2. The method of claim 1 wherein the step of securing the writing tube in a surrounding relationship to the front of said cylindrical member comprises pushing the rear end of said formed writing tube over said front end of a preformed cylindrical member.

3. The method of claim 1 wherein the step of securing the writing tube in a surrounding relationship to the front of said cylindrical member comprises molding said front end of said cylindrical member within said formed writing tube.

4. The method of producing a writing point for a stylographic, or tube writing pen of the type wherein the writing point comprises, in combination, a plastic cylindrical member, traversed from end to end by a channel for the passage therethrough of ink from an ink reservoir at a rear end of the channel, a metal writing tube attached to a front end of said cylindrical member, comprising the steps of:
  A. forming said writing tube by deep drawing a flat blank of metal in successive stages, to form an elongated cup, and;
  B. cutting off the bottom of said cup to define a front end of said writing tube, and;
  C. cold forming said front end of said writing tube to there produce a smooth flat writing surface and a defined outlet orifice for ink, and;
  D. attaching said writing tube in surrounding relation to said cylindrical member by pushing the rear end of said writing tube over the front end of said cylindrical member so that said ink channel directly communicates with said defined outlet orifice to supply ink to said writing surface.

5. The method according to claim 4 further including inserting a weighted cleaning wire into said channel, whereby said ink is supplied to said writing surface through an annulus defined between the cleaning wire and the channel.

* * * * *